(12) United States Patent
Ochiai

(10) Patent No.: US 12,516,261 B2
(45) Date of Patent: Jan. 6, 2026

(54) METHOD FOR TREATING CARBON DIOXIDE CONTAINED IN NATURAL GAS AND AQUEOUS DISPERSION USED THEREIN

(71) Applicant: JONQUIL CONSULTING INC., Tokyo (JP)

(72) Inventor: Shigeru Ochiai, Tokyo (JP)

(73) Assignee: JONQUIL CONSULTING INC., Tokyo (JP)

( * ) Notice: Subject to any disclaimer, the term of this patent is extended or adjusted under 35 U.S.C. 154(b) by 543 days.

(21) Appl. No.: 18/071,377

(22) Filed: Nov. 29, 2022

(65) Prior Publication Data

US 2024/0174935 A1    May 30, 2024

(51) Int. Cl.
*C10L 3/10* (2006.01)
*B01D 53/14* (2006.01)
*B01D 53/62* (2006.01)
*B01D 53/78* (2006.01)
*C01B 32/184* (2017.01)

(52) U.S. Cl.
CPC .......... *C10L 3/104* (2013.01); *B01D 53/1475* (2013.01); *B01D 53/1493* (2013.01); *B01D 53/62* (2013.01); *B01D 53/78* (2013.01); *C01B 32/184* (2017.08); *B01D 2251/304* (2013.01); *B01D 2251/402* (2013.01); *B01D 2251/404* (2013.01); *B01D 2251/408* (2013.01); *B01D 2251/604* (2013.01); *B01D 2257/504* (2013.01); *C10L 2290/541* (2013.01)

(58) Field of Classification Search
CPC .. C10L 3/104; C10L 2290/541; C01B 32/184; B01D 53/1475; B01D 53/1493; B01D 53/78; B01D 53/62; B01D 2251/304

See application file for complete search history.

(56) References Cited

U.S. PATENT DOCUMENTS

| | | |
|---|---|---|
| 2014/0076158 A1 | 3/2014 | Tour et al. |
| 2024/0209534 A1 | 6/2024 | Darvas et al. |

FOREIGN PATENT DOCUMENTS

| | | | |
|---|---|---|---|
| JP | 2010125354 A | * | 6/2010 |
| JP | 6905694 B1 | | 6/2021 |
| JP | 2021171706 A | | 11/2021 |
| WO | 2012158194 A1 | | 11/2012 |
| WO | 2022013583 A1 | | 1/2022 |

OTHER PUBLICATIONS

Australian Office Action dated Nov. 26, 2024, issued in counterpart Australian Application No. 2023202224.

* cited by examiner

*Primary Examiner* — Anthony J Zimmer
*Assistant Examiner* — Annette Phan
(74) *Attorney, Agent, or Firm* — Holtz, Holtz & Volek PC

(57) ABSTRACT

There is provided with a carbon dioxide treating method capable of suppressing a decrease in the content of a hydrocarbon contained in natural gas before and after removal of carbon dioxide. A method for treating carbon dioxide contained in natural gas comprises: preparing an aqueous dispersion containing magnesium hydroxide and acetonitrile; bringing the aqueous dispersion and the natural gas into contact with each other; and making the magnesium hydroxide and the carbon dioxide react with each other, wherein the aqueous dispersion further contains metal hydroxides, and the metal hydroxides include barium hydroxide, zinc hydroxide, sodium hydroxide, and calcium hydroxide.

8 Claims, No Drawings

METHOD FOR TREATING CARBON DIOXIDE CONTAINED IN NATURAL GAS AND AQUEOUS DISPERSION USED THEREIN

BACKGROUND OF THE INVENTION

Field of the Invention

The present invention relates to a method for treating carbon dioxide contained in natural gas, and an aqueous dispersion used therein.

Description of the Related Art

Natural gas is considered as a fuel that puts a low burden on the environment in fossil energies because it generates a small amount of carbon dioxide per heating value when it burns. As handling of environmental problems and measures to diversification of energy resources have been demanded worldwide, natural gas has received attention as an alternative fuel of petroleum.

Natural gas produced from a gas field or an oil field often contains carbon dioxide in addition to methane that is a main component. Hence, after the carbon dioxide contained in it is removed, the natural gas is used as a product gas serving as a raw material of liquefied natural gas or the like.

On the other hand, as techniques for removing or recovering carbon dioxide contained in various gases, a chemical absorption method using an absorbent solution, a physical absorption method, a membrane separation method, an absorption method, and the like are known. Japanese Patent No. 6905694 discloses a technique of treating carbon dioxide using an aqueous dispersion containing magnesium hydroxide and acetonitrile.

SUMMARY OF THE INVENTION

According to one embodiment of the present invention, a method for treating carbon dioxide contained in natural gas comprises: preparing an aqueous dispersion containing magnesium hydroxide and acetonitrile; bringing the aqueous dispersion and the natural gas into contact with each other; and making the magnesium hydroxide and the carbon dioxide react with each other, wherein the aqueous dispersion further contains metal hydroxides, and the metal hydroxides include barium hydroxide, zinc hydroxide, sodium hydroxide, and calcium hydroxide.

DESCRIPTION OF THE EMBODIMENTS

Japanese Patent No. 6905694 discloses treating carbon dioxide contained in natural gas. However, the change of the content of a hydrocarbon contained in the natural gas before and after removal of the carbon dioxide has not been examined.

An embodiment of the present invention provides a carbon dioxide treating method capable of suppressing a decrease in the content of a hydrocarbon contained in natural gas before and after removal of carbon dioxide.

Note that the following embodiments are not intended to limit the scope of the claimed invention, and limitation is not made an invention that requires all combinations of features described in the embodiments. Two or more of the multiple features described in the embodiments may be combined as appropriate.

Furthermore, the same reference numerals are given to the same or similar configurations, and redundant description thereof is omitted.

[Method for Treating Carbon Dioxide Contained in Natural Gas]

A method for treating carbon dioxide contained in natural gas according to this embodiment includes preparing an aqueous dispersion containing magnesium hydroxide and acetonitrile, bringing the aqueous dispersion and the natural gas into contact with each other, and making the magnesium hydroxide and the carbon dioxide react with each other. Also, the aqueous dispersion contains metal hydroxides including barium hydroxide, zinc hydroxide, sodium hydroxide, and calcium hydroxide. This can remove carbon dioxide contained in natural gas and suppress a decrease of the content of a hydrocarbon contained in the natural gas before and after carbon dioxide removal processing. It is also possible to adjust the treatment speed when removing carbon dioxide from natural gas.

<Natural Gas>

Natural gas according to this embodiment contains a hydrocarbon and carbon dioxide. The hydrocarbon contained in the natural gas mainly contains methane. Hydrocarbons other than methane include ethane, propane, isobutane, n-butane, isopentane, n-pentane, hexane, and the like. Also, the concentration of methane contained in the natural gas can be 80 vol % or more in one embodiment, 90 vol % or more in another embodiment, and 95 vol % or more in still another embodiment. The natural gas can also contain an impurity such as nitrogen.

The concentration of carbon dioxide contained in the natural gas is not particularly limited, and can be 1 vol % or more in one embodiment, 2 vol % or more in another embodiment, 10 vol % or more in still another embodiment, 20 vol % or more in yet another embodiment, and 40 vol % or more in yet another embodiment. Also, the concentration of carbon dioxide can be 70 vol % or less in one embodiment, 65 vol % or less in another embodiment, 60 vol % or less in still another embodiment, 55 vol % or less in yet another embodiment, and 50 vol % or less in yet another embodiment. Thus, the carbon dioxide can be absorbed by an aqueous dispersion at a sufficient absorption speed and absorption amount. Since the carbon dioxide treating method according to this embodiment can remove carbon dioxide from natural gas that contains the carbon dioxide at such a concentration, natural gas from a gas field containing carbon dioxide at a high concentration can also be the treatment target.

<Preparing Aqueous Dispersion>

The aqueous dispersion according to this embodiment contains water, magnesium hydroxide ($Mg(OH)_2$), acetonitrile ($CH_3CN$), and metal hydroxides other than magnesium hydroxide. When preparing the aqueous dispersion, the order of mixing the constituent components is not particularly limited. For example, the aqueous dispersion may be formed by adding acetonitrile and metal hydroxides to a dispersion of water and magnesium hydroxide, may be formed by adding magnesium hydroxide or a magnesium hydroxide precursor and metal hydroxides to a solution mixture of water and acetonitrile, may be formed by adding magnesium hydroxide or a magnesium hydroxide precursor and acetonitrile to a dispersion of water and metal hydroxides, or may be formed by adding water to a dispersion of magnesium hydroxide, acetonitrile, and metal hydroxides.

The concentration of magnesium hydroxide in the aqueous dispersion containing water, magnesium hydroxide, and acetonitrile is not particularly limited. The concentration of magnesium hydroxide is an included number, and is the ratio of magnesium hydroxide contained in the aqueous dispersion containing magnesium hydroxide and acetonitrile. As a solid content, the concentration of magnesium hydroxide can be 1 wt % or more in one embodiment, 5 wt % or more in another embodiment, 10 wt % or more in still another embodiment, 20 wt % or more in yet another embodiment, and 30 wt % or more in yet another embodiment. This improves the absorption efficiency of carbon dioxide in the aqueous dispersion. Also, as a solid content, the concentration of magnesium hydroxide can be 80 wt % or less in one embodiment, 70 wt % or less in another embodiment, 60 wt % or less in still another embodiment, 50 wt % or less in yet another embodiment, and 40 wt % or less in yet another embodiment. This causes the aqueous dispersion to have an appropriate viscosity, and the reaction of magnesium hydroxide and carbon dioxide becomes even.

The concentration of acetonitrile in a first aqueous dispersion containing water, magnesium hydroxide, and acetonitrile is not particularly limited. The concentration of acetonitrile is an included number, and is the ratio of acetonitrile contained in the first aqueous dispersion. The concentration of acetonitrile can be 1 wt % or more in one embodiment, 5 wt % or more in another embodiment, 10 wt % or more in still another embodiment, and 20 wt % or more in yet another embodiment. Also, the concentration of acetonitrile can be 60 wt % or less in one embodiment, 50 wt % or less in another embodiment, 40 wt % or less in still another embodiment, and 30 wt % or less in yet another embodiment. This facilitates adjusting the absorption speed of carbon dioxide in the aqueous dispersion.

Note that the aqueous dispersion containing magnesium hydroxide and acetonitrile will be sometimes referred to as the first aqueous dispersion such that this can be discriminated from an aqueous dispersion containing water, magnesium hydroxide, acetonitrile, and metal hydroxides.

The concentration of the metal hydroxides with respect to the aqueous dispersion containing water, magnesium hydroxide, and acetonitrile is not particularly limited. The total concentration of the metal hydroxides is an external number, and is the total ratio of the metal hydroxides with respect to the first aqueous dispersion. As a solid content, the total concentration of the metal hydroxides can be 1 wt % or more in one embodiment, 5 wt % or more in another embodiment, 10 wt % or more in still another embodiment, and 30 wt % or more in yet another embodiment. Also, the concentration of the metal-containing compounds can be 100 wt % or less in one embodiment, 90 wt % or less in another embodiment, 70 wt % or less in still another embodiment, and 60 wt % or less in yet another embodiment. Although not bound by any particular theory, the metal hydroxides can act on carbon dioxide and promote generation of magnesium carbonate from the carbon dioxide, and this facilitates adjusting the absorption speed of carbon dioxide in the aqueous dispersion.

The metal hydroxides include barium hydroxide, zinc hydroxide, sodium hydroxide, and calcium hydroxide. In one embodiment, the ratio of the barium hydroxide in the metal hydroxides is an included number, and can be 1 wt % or more in one embodiment, 5 wt % or more in another embodiment, 10 wt % or more in still another embodiment, and 30 wt % or more in yet another embodiment. Also, the ratio of the barium hydroxide can be 99 wt % or less in one embodiment, 80 wt % or less in another embodiment, 60 wt % or less in still another embodiment, and 50 wt % or less in yet another embodiment. If barium hydroxide is contained in the aqueous dispersion, the absorption speed of carbon dioxide improves, and a decrease of the content of the hydrocarbon contained in the natural gas can be suppressed before and after carbon dioxide removal processing.

(Dispersion of Magnesium Hydroxide)

In one embodiment, the aqueous dispersion is formed by preparing a dispersion of water and magnesium hydroxide in advance and charging acetonitrile and metal hydroxides into the dispersion. The dispersion of water and magnesium hydroxide can be formed by adding magnesium oxide or magnesium hydroxide to water. Alternatively, as the dispersion of water and magnesium hydroxide, a dispersion of commercially available water and magnesium hydroxide can be used.

In one embodiment, the dispersion of water and magnesium hydroxide is prepared by charging magnesium oxide (MgO) into water such that the above-described magnesium hydroxide concentration in the aqueous dispersion is obtained, and stirring these at a predetermined temperature. The temperature and stirring at the time of preparation are not particularly limited, and the preparation can be done at room temperature (for example, 25±15° C.).

The purity of magnesium oxide can be 80 wt % or more in one embodiment, 90 wt/o or more in another embodiment, and 95 wt % or more in still another embodiment. This improves the absorption efficiency of carbon dioxide in the aqueous dispersion.

In one embodiment, magnesium oxide can be powder. The average particle size (D50) of magnesium oxide is 500 nm or less in one embodiment, 300 nm or less in another embodiment, 200 nm or less in still another embodiment, 100 nm or less in yet another embodiment, and 80 nm or less in yet another embodiment. Also, the average particle size (D50) of magnesium oxide is 1 nm or more in one embodiment, 10 nm or more in another embodiment, 20 nm or more in still another embodiment, 30 nm or more in yet another embodiment, and 40 nm or more in yet another embodiment. If magnesium oxide has such an average particle size, reaction between magnesium hydroxide generated in the aqueous dispersion and carbon dioxide improves. The average particle size (D50) is a value obtained by a volume-based grain size distribution based on a laser diffraction/scattering method, and the D50 value means the particle size (median diameter) at a cumulative percentage of 50%.

Water functions as a solvent and is not particularly limited. The origin of water is not particularly limited, and tap water, ground water, distilled water, ion exchange water, or the like can be used.

(Acetonitrile)

The purity of acetonitrile contained in the aqueous dispersion is not particularly limited. The purity of acetonitrile can be 90 wt % or more in one embodiment, 95 wt % or more in another embodiment, 98 wt % or more in still another embodiment, and 99 wt % or more in yet another embodiment. This improves adjustment of the absorption speed of carbon dioxide in the aqueous dispersion.

(Metal Hydroxides)

The purity of each metal hydroxide contained in the aqueous dispersion is not particularly limited. The purity of each metal hydroxide can be 80 wt % or more in one embodiment, 90 wt % or more in another embodiment, and 95 wt % or more in still another embodiment. This improves the absorption efficiency of carbon dioxide in the aqueous dispersion.

In one embodiment, each metal hydroxide can be powder. The average particle size (D50) of each metal hydroxide is 1,000 μm or less in one embodiment, 700 μm or less in another embodiment, 500 μm or less in still another embodiment, 100 µm or less in yet another embodiment, 50 µm or less in yet another embodiment, and 10 µm or less in yet another embodiment. Also, the average particle size (D50) of each metal hydroxide is 1 µm or more in one embodiment, 2 µm or more in another embodiment, 3 µm or more in still another embodiment, 4 µm or more in yet another embodiment, 5 µm or more in yet another embodiment, and 6 µm or more in yet another embodiment. If each metal hydroxide has such an average particle size, the absorption speed of carbon dioxide improves. The average particle size (D50) is a value obtained by a volume-based grain size distribution based on a laser diffraction/scattering method, and the D50 value means the particle size (median diameter) at a cumulative percentage of 50%.

In one embodiment, the aqueous dispersion is formed by preparing the first aqueous dispersion containing magnesium hydroxide and acetonitrile and charging the metal hydroxides into the first aqueous dispersion. The metal hydroxides may be charged, as a dispersion with water, into the first aqueous dispersion. The dispersion of the metal hydroxides and water is prepared by charging the metal hydroxides into water such that the above-described metal hydroxide concentration in the first aqueous dispersion is obtained, and stirring these at a predetermined temperature. The temperature and stirring at the time of preparation are not particularly limited, and the preparation can be done at room temperature (for example, 25±15° C.). Also, as the dispersion of the metal hydroxides and water, a dispersion of commercially available metal hydroxides and water can be used.

(Additives)

In one embodiment, the aqueous dispersion containing water, magnesium hydroxide, acetonitrile, and metal hydroxides can further contain various additives, for example, dispersants. The materials of dispersants are not particularly limited and, for example, a dispersant of an inorganic compound, a high molecular surfactant, and the like can be used. Hence, even if the solid concentration of magnesium hydroxide is high, the dispersibility of magnesium hydroxide improves, and the reaction of magnesium hydroxide and carbon dioxide becomes even. In one embodiment, when preparing the dispersion of water and magnesium hydroxide, the dispersant is charged into water in advance before magnesium hydroxide or magnesium oxide is charged. When magnesium hydroxide or magnesium oxide is then charged, the magnesium hydroxide can evenly be dispersed.

<Making Aqueous Dispersion and Natural Gas Contact and React>

In contact and reaction of natural gas according to this embodiment, natural gas containing carbon dioxide is brought into contact with the above-described aqueous dispersion and made to react with magnesium hydroxide in the aqueous dispersion. The method of making the natural gas and the aqueous dispersion contact and react with each other is not particularly limited, and a method of blowing natural gas to the aqueous dispersion, a method of introducing natural gas into the aqueous dispersion by bubbling, a method of spraying the aqueous dispersion into natural gas, a method of bringing natural gas into counterflow contact with the aqueous dispersion, and the like can be used.

In one embodiment, the temperature of the aqueous dispersion at the time of contact and reaction of the natural gas is not particularly limited, and these can be done at room temperature (for example, 25±15° C.). This can improve the absorption speed and the absorption amount of carbon dioxide. The natural gas and the aqueous dispersion may be made to contact and react while stirring the aqueous dispersion. The introduction speed of the natural gas is not particularly limited and can be decided in accordance with the carbon dioxide treatment speed of the aqueous dispersion.

Also, the pressure of the natural gas is not particularly limited and can be, for example, a pressure equal to or higher than the atmospheric pressure. This can improve the absorption speed and the absorption amount of carbon dioxide. Note that the pressure of the natural gas can also be set to a pressure lower than the atmospheric pressure.

<Product>

In contact and reaction of natural gas according to this embodiment, magnesium carbonate is produced. The magnesium carbonate can be recovered by a conventionally known method such as filtering. The magnesium carbonate can be used in flooring materials, fireproof material, fire extinguishing compositions, cosmetic products, dust, toothpastes, fillers, smoke depressors in plastics, reinforcing agents in neoprene rubber, desiccants, color retaining agents in foods, mat white coating for projection screens, and the like.

In one embodiment, if magnesium carbonate is heated at a predetermined temperature (for example, 600° C.) in metal magnesium, a mixture of graphene and magnesium oxide is formed. The mixture is mixed with at least one of water and an acidic aqueous solution. If filtering or the like is performed, graphene can be separated from the magnesium-containing liquid. The graphene has conductivity, optical characteristics, spin transportation and magnetic field effects, and can be used as an electronic device constituent element. On the other hand, the magnesium-containing liquid can be reused as a part of the aqueous dispersion according to this embodiment.

Summary of Embodiment

The disclosure of this specification includes a method for treating carbon dioxide contained in natural gas and an aqueous dispersion below.

(Item 1)

There is provided a method for treating carbon dioxide contained in natural gas comprising:

preparing an aqueous dispersion containing magnesium hydroxide and acetonitrile;

bringing the aqueous dispersion and the natural gas into contact with each other; and making the magnesium hydroxide and the carbon dioxide react with each other, wherein the aqueous dispersion further contains metal hydroxides, and the metal hydroxides include barium hydroxide, zinc hydroxide, sodium hydroxide, and calcium hydroxide.

(Item 2)

In the method according to Item 1, a content of the metal hydroxides in the aqueous dispersion containing the magnesium hydroxide and the acetonitrile is not less than 1 wt % and not more than 100 wt %.

(Item 3)

In the method according to Item 1 or 2, a content of the acetonitrile in the aqueous dispersion containing the magnesium hydroxide and the acetonitrile is not less than 10 wt % and not more than 40 wt/o.

(Item 4)

In the method according to any one of Items 1 to 3, the reaction between the magnesium hydroxide and the carbon dioxide is performed while stirring the aqueous dispersion.

(Item 5)

In the method according to any one of Items 1 to 4,
the preparing the aqueous dispersion comprises:
preparing a dispersion by dispersing magnesium oxide in water; and
charging the acetonitrile and the metal hydroxides into the dispersion.

(Item 6)

In the method according to Item 5, the magnesium oxide has an average particle size (D50) of not more than 100 nm.

(Item 7)

The method according to any one of Items 1 to 6 further comprises heating, in metal magnesium, a reaction product between the magnesium hydroxide and the carbon dioxide, thereby forming graphene.

(Item 8)

There is provided an aqueous dispersion used in a method for treating carbon dioxide defined in any one of Items 1 to 6,
wherein the aqueous dispersion contains water, magnesium hydroxide, acetonitrile, barium hydroxide, zinc hydroxide, sodium hydroxide, and calcium hydroxide.

EXAMPLES

This embodiment will be described below based on examples. However, this embodiment is not limited to the following examples unless the gist is changed.

Example 1

A dispersion of water and magnesium hydroxide was prepared by mixing magnesium oxide with water such that the concentration of magnesium hydroxide became 12 wt % as a solid content in the dispersion. Magnesium oxide having a purity of 99.8% and an average particle size (D50) of 50 nm was used. Next, to prepare a first aqueous dispersion containing water, magnesium hydroxide, and acetonitrile, acetonitrile was charged into the dispersion of water and magnesium hydroxide such that the concentration of acetonitrile in the first aqueous dispersion became 26 wt %. Acetonitrile having a purity of 99 wt % or more was used.

Next, an aqueous dispersion was prepared by charging barium hydroxide, zinc hydroxide, sodium hydroxide, and calcium hydroxide into the first aqueous dispersion such that the concentration of barium hydroxide to the first aqueous dispersion of water, magnesium hydroxide, and acetonitrile became 19 wt %, the concentration of zinc hydroxide became 12 wt %, the concentration of sodium hydroxide became 19 wt %, and the concentration of calcium hydroxide became 9 wt %. Barium hydroxide powder having an average particle size of 4.5 μm, zinc hydroxide powder having an average particle size of 6 to 9 μm, sodium hydroxide powder having an average particle size of 0.7 mm, and calcium hydroxide powder having an average particle size of 10 μm were used.

The prepared aqueous dispersion was put into a treatment container, and the treatment container was sealed. The gas inlet of the treatment container was connected to a natural gas source, and the gas outlet of the container was connected to a gas chromatograph (available from Hewlett-Packard). Subsequently, natural gas was introduced into the treatment container, and the aqueous dispersion and the natural gas were made to contact for 5 min while stirring the aqueous dispersion in the treatment container at 500 rpm. After that, the natural gas after the treatment in the treatment container was introduced into the gas chromatograph, and the components were analyzed. As the natural gas before the treatment, natural gas containing 96.99 mol % methane, 1.14 mol % carbon dioxide, 0.34 mol % nitrogen, and 1.53 mol % hydrocarbons such as ethane, propane, isobutane, n-butane, isopentane, n-pentane, hexane and other impurities was used.

The concentration of carbon dioxide contained in the natural gas after the treatment was 0.018 mol %, and 99.98% of carbon dioxide contained in the natural gas before the treatment was removed. The concentration of methane contained in the natural gas after the treatment was 97.97 mol %. Since carbon dioxide was removed from the natural gas, the concentration of methane was higher than before the treatment. However, the decrease of the content of methane contained in the natural gas was suppressed before and after the treatment. Thus, carbon dioxide was removed from the natural gas, and the decrease of the content of methane that was the main component contained in the natural gas could be suppressed before and after the carbon dioxide removal processing. In addition, the decrease of the contents of ethane, propane, and the like that were other hydrocarbon components contained in the natural gas was also suppressed.

Example 2

An aqueous dispersion in which the components and their concentrations were the same as in the aqueous dispersion of Example 1, but the amount of each component was three times larger was prepared. The prepared aqueous dispersion was put into a treatment container whose capacity was twice larger than the treatment container used in Example 1, and the treatment container was sealed. The gas inlet of the treatment container was connected to a natural gas source, and the gas outlet of the treatment container was connected to a gas chromatograph (available from Hewlett-Packard). Natural gas that was the same as that used in Example 1 was introduced into the treatment container, and the aqueous dispersion and the natural gas were made to contact for 5 min while stirring the aqueous dispersion in the treatment container at 1,000 rpm. After that, the natural gas after the treatment in the treatment container was introduced into the gas chromatograph, and the components were analyzed.

The concentration of carbon dioxide contained in the natural gas after the treatment was 0.008 mol %, and 99.96% of carbon dioxide contained in the natural gas before the treatment was removed. The concentration of methane contained in the natural gas after the treatment was 97.95 mol %. Since carbon dioxide was removed from the natural gas, the concentration of methane was higher than before the treatment. However, the decrease of the content of methane contained in the natural gas was suppressed before and after the treatment. Thus, carbon dioxide was removed from the natural gas, and the decrease of the content of methane that was the main component contained in the natural gas could be suppressed before and after the carbon dioxide removal processing. In addition, the decrease of the contents of ethane, propane, and the like that were other hydrocarbon components contained in the natural gas was also suppressed.

The invention is not limited to the foregoing embodiments, and various variations/changes are possible within the spirit of the invention.

What is claimed is:

1. A method for treating carbon dioxide contained in natural gas comprising:
preparing an aqueous dispersion containing magnesium hydroxide and acetonitrile;
bringing the aqueous dispersion and the natural gas into contact with each other; and
making the magnesium hydroxide and the carbon dioxide react with each other,
wherein the aqueous dispersion further contains metal hydroxides, and the metal hydroxides include barium hydroxide, zinc hydroxide, sodium hydroxide, and calcium hydroxide, and
wherein the metal hydroxides are not less than 10 wt % and not more than 80 wt % barium hydroxide.

2. The method according to claim 1, wherein a content of the metal hydroxides in the aqueous dispersion containing the magnesium hydroxide and the acetonitrile is not less than 1 wt % and not more than 100 wt %.

3. The method according to claim 1, wherein a content of the acetonitrile in the aqueous dispersion containing the magnesium hydroxide and the acetonitrile is not less than 10 wt % and not more than 40 wt %.

4. The method according to claim 1, wherein the reaction between the magnesium hydroxide and the carbon dioxide is performed while stirring the aqueous dispersion.

5. The method according to claim 1, wherein
the preparing the aqueous dispersion comprises:
preparing a dispersion by dispersing magnesium oxide in water; and
charging the acetonitrile and the metal hydroxides into the dispersion.

6. The method according to claim 5, wherein the magnesium oxide has an average particle size (D50) of not more than 100 nm.

7. The method according to claim 1, further comprising heating, in metal magnesium, a reaction product between the magnesium hydroxide and the carbon dioxide, thereby forming graphene.

8. An aqueous dispersion used in a method for treating carbon dioxide defined in claim 1,
wherein the aqueous dispersion contains water, magnesium hydroxide, acetonitrile, barium hydroxide, zinc hydroxide, sodium hydroxide, and calcium hydroxide, and
wherein an amount of the barium hydroxide in the barium hydroxide, the zinc hydroxide, the sodium hydroxide, and the calcium hydroxide is not less than 10 wt % and not more than 80 wt %.

* * * * *